US006530603B1

(12) United States Patent
Hartman

(10) Patent No.: US 6,530,603 B1
(45) Date of Patent: *Mar. 11, 2003

(54) SELF-COVERING ELEMENT

(75) Inventor: Steven Hartman, Brampton (CA)

(73) Assignee: Industrial Thermo Polymers Limited, Brampton (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,264

(22) Filed: Feb. 17, 1998

(51) Int. Cl.[7] .............................. F16L 59/14; F16L 9/22; B32B 5/18
(52) U.S. Cl. ........................................ 285/47; 138/156
(58) Field of Search ..................... 285/47, 179, 133.11; 138/156, 170, 128

(56) References Cited

U.S. PATENT DOCUMENTS

| | | | | | |
|---|---|---|---|---|---|
| 2,717,848 A | * | 9/1955 | Jaye | .............. | 285/47 |
| 4,022,248 A | * | 5/1977 | Hepner et al. | .............. | 138/156 |
| 4,093,683 A | * | 6/1978 | Harley | .............. | 138/156 |
| 4,205,105 A | * | 5/1980 | Blundell | .............. | 428/36 |
| 4,243,453 A | * | 1/1981 | McClintock | .............. | 138/156 |
| 4,442,585 A | * | 4/1984 | McGehee, Sr. et al. | ........ | 29/432 |
| 4,463,780 A | * | 8/1984 | Schultz et al. | .............. | 138/156 |
| 4,526,736 A | * | 7/1985 | Searl et al. | .............. | 264/53 |
| 4,713,271 A | * | 12/1987 | Searl et al. | .............. | 138/156 |
| 4,748,060 A | * | 5/1988 | Fry et al. | .............. | 138/156 |
| 4,805,444 A | * | 2/1989 | Webb | .............. | 73/40.5 R |
| 4,807,669 A | * | 2/1989 | Prestidge, Sr. | .............. | 138/178 |
| 4,857,371 A | * | 8/1989 | McClintock | .............. | 138/156 |
| 5,055,334 A | * | 10/1991 | Lechuga | .............. | 428/99 |
| 5,427,849 A | * | 6/1995 | McClintock et al. | ........ | 138/156 |

FOREIGN PATENT DOCUMENTS

| | | | | |
|---|---|---|---|---|
| DE | 3300443 | * | 7/1984 | |
| DE | 3431477 | * | 2/1986 | ............... 285/47 |
| FR | 2569464 | * | 2/1986 | ............... 285/47 |
| GB | 2241546 | * | 9/1991 | ............... 285/47 |
| JP | 2000-120981 | * | 10/1998 | |

* cited by examiner

Primary Examiner—Eric K. Nicholson

(57) ABSTRACT

A self-covering element for covering a pipe joint comprising of a deformable, hollow insulating element having a first portion and a second portion attached at an angle to one another. A longitudinal slit runs the length of the first and second portions, and a pressure sensitive adhesive with a removable release film is adhered to the longitudinal slit. The deformable insulating element allows for the entry of the pipe joint through the longitudinal slit, and surrounds the pipe joint. The pressure sensitive adhesive then seals the longitudinal slit and the pipe joint into the hollow cavity once the release film is removed.

14 Claims, 4 Drawing Sheets

SELF-COVERING ELEMENT

FIELD OF INVENTION

This invention relates generally to insulating elements, and more particularly to self-covering elements or joints that are made from foam having an adhesive closure and insulating properties.

BACKGROUND OF INVENTION

There have been a number of different attempts to produce an effective insulation material for pipes that not only minimizes heat transfer from the pipe to the atmosphere, but also inhibits the formation of moisture on the pipe's surface. Prior art insulating elements have been devised to address the aforenoted problems.

U.K. Patent No. 2,296,749 to Villain S. A. for a "Pipe Insulation Element" relates to a pipe—insulating assembly is formed by insulating elements surrounding a pipe, each having joint surfaces with optional inter-engaging male and female assembly parts which are homologous extending along their lengths. Each element has an external covering of metal or plastic sheet curved in the shape of a channel and terminating in flanged edges and corresponding at least to a portion of the periphery of the structure to be produced, the channel receiving an insulating rigid foam so as to leave a depression shaped and dimensioned like the pipe to be insulated. The joint surface is provided with a layer of flexible foam and the closing of an insulating element on itself or the joining of insulating elements to one another is effected face to face by the layers of flexible foam.

CH Patent No. 598,534 to Albert Berner for a "Thermoplastic Insulating Sheath For Pipes" relates to a sheath that is formed by rolling a strip of thermoplastic insulating material into a tube, and joining its longitudinal edges together by welding. The joint may be formed by heat welding, or ultrasonic welding, preferred spot welding with a distance of 2 mm between spots, or HF welding. The joint may be a flange weld, a lap weld or a butt weld. When fitted over the pipe, the sheath forms a continuous water-tight covering, as long as, in the case of spot welded sheaths, the distance between spots is reduced sufficiently. The welding operation and the presence of a welded joint in no way diminish the initial properties of the plastic material with respect to thermal and sound insulation and protection against corrosion of the pipes.

BE Patent No. 716,646 to Cie De Saint-Gobain (Comp) for "Adhesive Bonded PVC Aluminium Sheath For Securing Pipe" relates to pipe insulation jacket comprising a split tube of conventional expanded or resin-bonded fibre insulating material which is covered with an integral sheath of thermo plastic (PVC) or metal (aluminium) which is bonded to the jacket with a permanently resilient adhesive and which extends beyond one edge of the axial parting line of the jacket and beyond one end of the jacket. The extended portions of the sheath are coated with a contact adhesive which is protected by a removable release paper or similar until the jacket is fitted about a pipe and/or adjacent to another section of jacket and the adhesive flaps are used to provide an overlapped, sealed joint. The opposing faces of the jacket may also be adhesive coated.

U.S. Pat. No. 5,419,859 to Hartman et al for "Method Of Forming Pipe Insulation With An Adhesive Closure" relates to a method for applying a closing tape to an extruded foam article is disclosed. The tape is applied immediately after the article is extruded and while the article is still subject to shrinkage, which is common with extruded foamed products. The tape is prestressed and is of a material to alleviate the problems associated with shrinkage. This method is particularly appropriate for applying a closing tape to an extruded polyethylene pipe insulation product which has been longitudinally slit to allow the pipe to be located interior to the insulation. The tape has one side attached to one side of the slit with the other portion of the tape being positioned for closing the slit by engaging the opposite side of the slit. A pressure sensitive adhesive is provided on the tape and a release liner protects the adhesive on the other portion of the tape.

Therefore a self-covering element which would provide for proper insulation of a pipe in both hot and cold situations, which self releases from a first position to a second position, is deformable and is self-sealing is desirable.

SUMMARY OF THE INVENTION

An object of one aspect of the present invention is to provide an improved self-covering element for intersecting pipes.

In accordance with one aspect of the present invention, there is provided a self-covering element for covering a pipe joint comprising of an insulating element having an inner peripheral surface and an outer peripheral surface, such that the inner surface defines a hollow cavity. The insulating element further comprises a deformable first portion and a second portion attached at an angle to one another, and a longitudinal slit which runs the length of the inner and outer peripheral surfaces. A pressure sensitive adhesive with a removable release film is adhered to the longitudinal slit. The deformable insulating element allows for the entry of the pipe joint through the longitudinal slit, and surrounds the pipe joint. The pressure sensitive adhesive then seals the longitudinal slit and the pipe joint into the hollow cavity once the release film is removed.

In accordance with still another aspect of the invention, there is provided a self-covering element wherein the first and second portions of the insulating element are deformable from a first open position to a second closed position. The first and second portions of the insulating element may be biased to the second closed position so that the insulating element is self-closing.

Advantages of the present invention are: the self-covering element may be easily installed on pipe joints such as an elbow or T-joint, thereby providing these joints with effective insulation in both hot and cold conditions; the pressure sensitive adhesive and removable release film allow for the quick and easy installation and securing of the insulating element to the pipe joint; and the deformable quality of the insulating element allows for the portions of the insulating element to be biased to a closed position thereby aiding in the sealing of the longitudinal slit and securing the insulating element to the pipe joint.

BRIEF DESCRIPTION OF DRAWINGS

A detailed description of the preferred embodiment is provided herein below with reference to the following drawings, in which.

Figure 1:
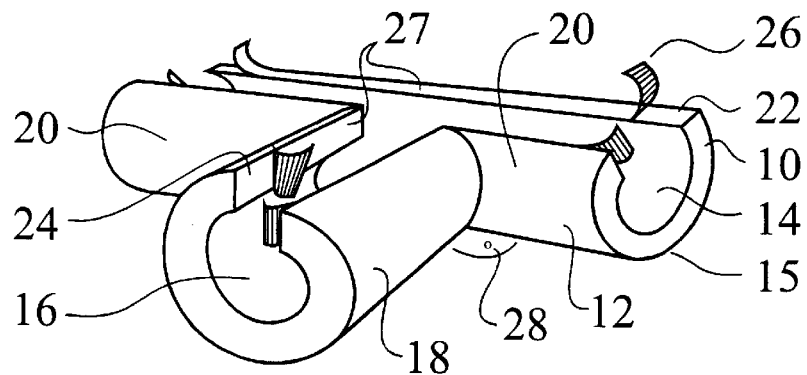
FIG. 1, in a perspective view, illustrates a self-covering element for a pipe joint therefore in accordance with the preferred embodiment of the present invention.

In the drawings, preferred embodiments of the invention are illustrated by way of example. It is to be expressly understood that the description and drawings are only for the purpose of illustration, and are not intended as a definition of the limits of the invention.

BEST MODE FOR CARRYING OUT THE INVENTION

In the description which follows, like parts are marked throughout the specification and the drawings with the same respective reference numerals. The drawings are not necessarily to scale and in some instances proportions may have been exaggerated in order to more clearly depict certain features of the invention.

Figure 2:
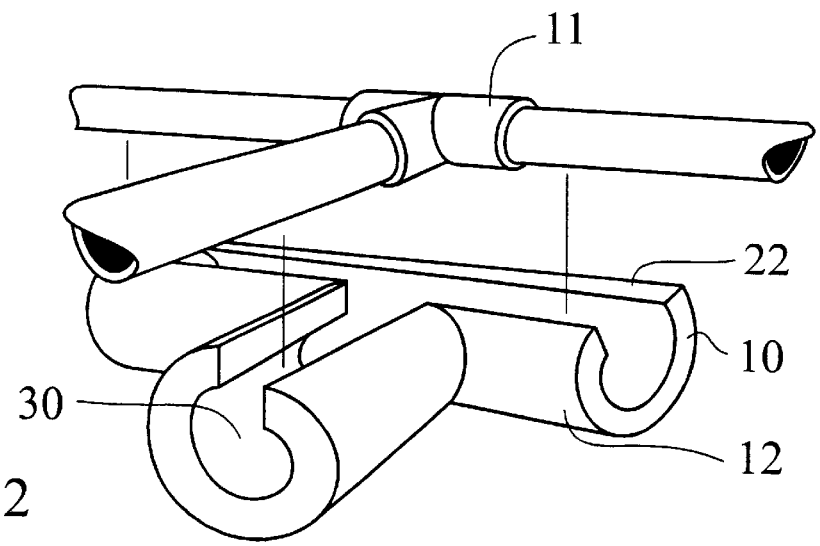
FIG. 2, in a perspective view, illustrates the operation of the self-covering element for a pipe joint of FIG. 1 and the pipe joint.

Referring to FIG. 1, there is illustrated is a perspective view, a self-covering element 10 for covering a pipe joint 11 in accordance with a preferred embodiment of the present invention. The pipe joint shown in FIG. 2 illustrates the standard "T" joint, although the invention to be described herein can be used for any intersecting joint, such as the elbow shown in FIG. 4. The self-covering element 10 for covering a pipe joint 11 includes an insulating element 12 having an inner peripheral surface 14 and an outer peripheral surface 15, the inner surface 14 defines a hollow cavity 16. The insulating element 12 may have a first portion 18 and a second portion 20 joined at jointure 23. A longitudinal slit 22 runs the length of the inner and outer peripheral surfaces, 14 and 15 respectively, of first portion 18 and second portion 20. More specifically the pipe joint 11 generally defines a plane of the pipe joint. Furthermore the.slit 22 is disposed through the Inner and outer surfaces 14 and 15 respectively in a direction generally laterally towards said plane. More specifically the slit 22 extends along the length of the first and second portions 18 and 20 respectively through the outer and inner surface 15 and 14 respectively in a direction generally perpendicular to the plane of said pipe joint 11. A pressure sensitive adhesive 24 with a removable release film 26 is adhered to the length of sides 27 of the longitudinal slit 22. The first portion 18 of the insulating element 12 may be disposed at an angle 28 to the second portion 20 of the insulating element 12.

Figure 3:
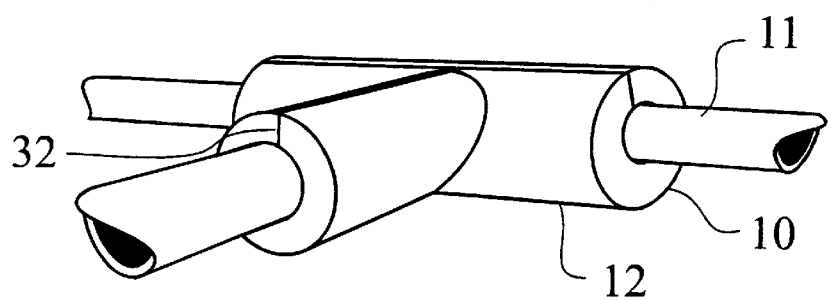
FIG. 3, in a perspective view, illustrates the operation of the self-covering element for a pipe joint of FIG. 1 and the pipe joint.

Referring to FIGS. 2 and 3, the insulating element 12 and more specifically, the first portion 18 and the second portion 20, may be deformable as a unit so as to allow the entry of the pipe joint 11 through the longitudinal slit 22. The insulating element 12 therefore may have a first open position 30 and a second closed position 32, with the insulating element 12 being biased to the second closed position 32 so as to encourage the self-covering element to be not only self-covering, but self-closing.

Figure 6:
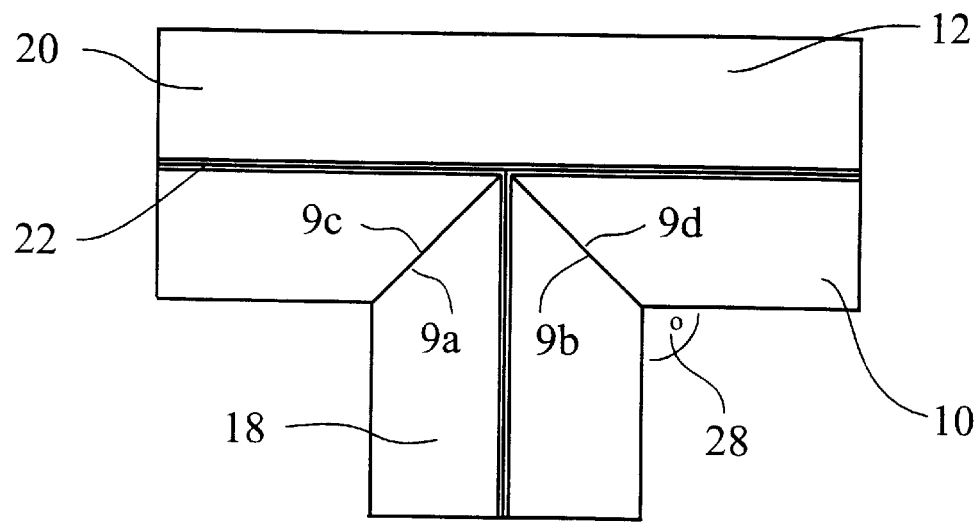
FIG. 6, in a top view, illustrates the self-covering element for a pipe joint of FIG. 1.
Figure 8:
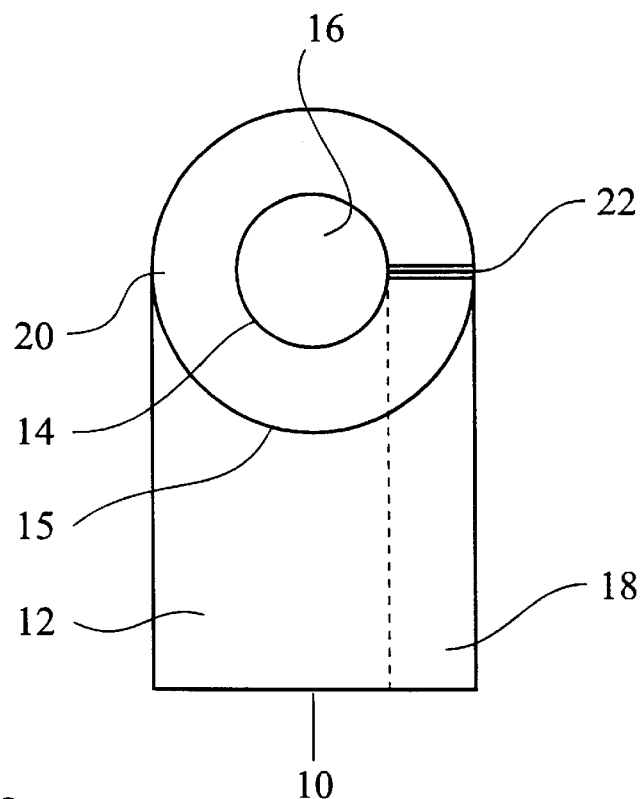
FIG. 8, in a side view, illustrates the self-covering element for a pipe joint of FIG. 1.
Figure 9:
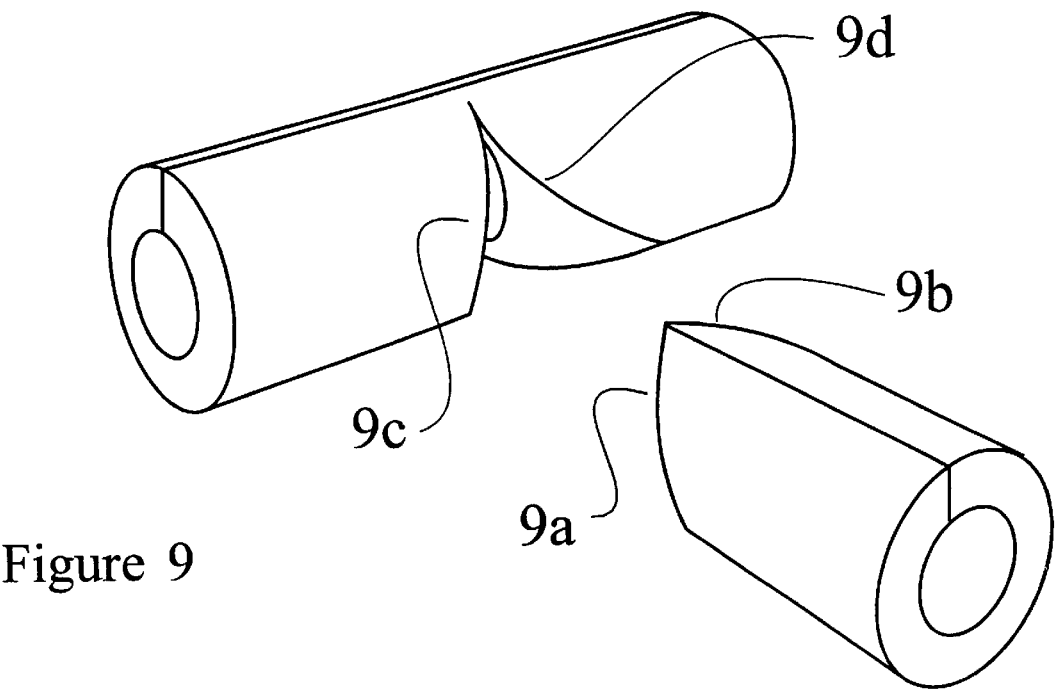
FIG. 9, in an exploded view, illustrates the self-covering element for a pipe joint of FIG. 1.

Referring to FIGS. 6 and 8, the first portion 18 and the second portion 20 of the insulating element 12 may be mitred together at an angle 28 to allow the insulating element 12 to fit around the pipe joint 11. Different angles and orientations of the first and second portions 18 and 20 respectively may exist, for example an elbow joint or a T-shaped or any acute angle joint. All self-covering elements 10 may be made from a soft resilient material, such as polyethylene foam or the like.

Referring to FIGS. 1, 2 and 3, in operation, the first portion 18 and the second portion 20, and more specifically the inner peripheral surface 14 and an outer peripheral surface 15 of the longitudinal slit 22 are moved as a unit from the second closed position 32 to a first open position 30. The pipe joint 11 may be placed within the hollow cavity 16 of the insulating element 12. Upon the release of the inner and outer peripheral surfaces, 14 and 15 respectively, of the insulating element 12, the first portion 18 and second of portion 20 of the insulating element 12 will return to the second closed position 32 as the insulating element 12 is biased towards this second closed position 32. The removable release film 26 may then be peeled from the sides 27 of the longitudinal slit 22 to expose the pressure sensitive adhesive 24. The pipe joint 11 may be secured into the hollow cavity 16 by pressing the inner and outer peripheral surfaces 14 and 15, causing the pressure sensitive adhesive 24 located on each side 27 of the longitudinal slit 22 to adhere to one another.

Figure 4:
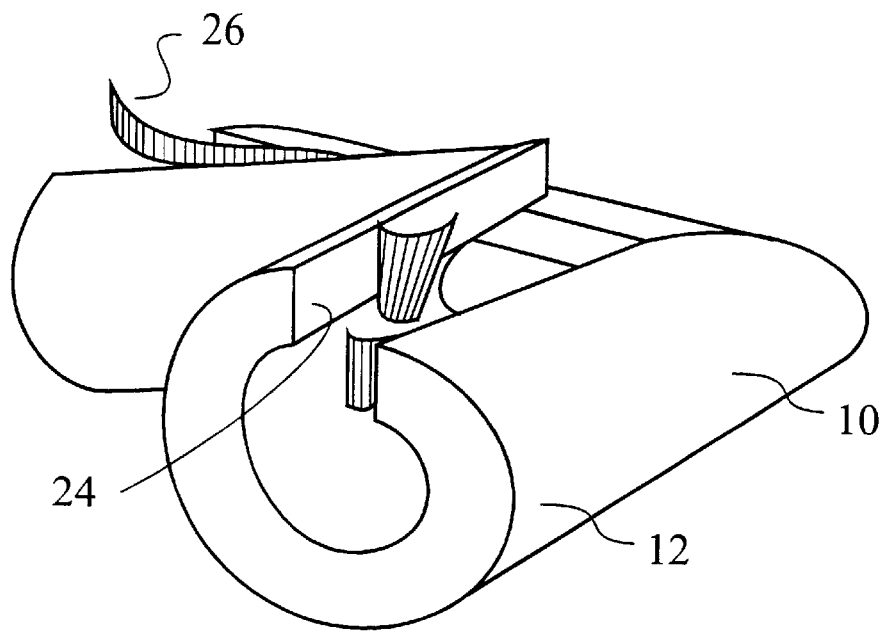
FIG. 4, in a perspective view, illustrates a second embodiment of the self-covering element for a pipe joint.
Figure 5:
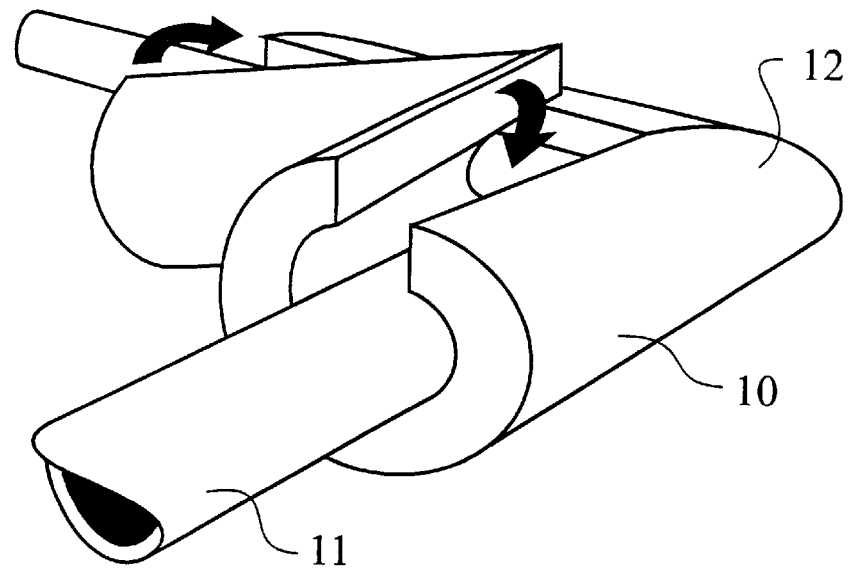
FIG. 5, in a perspective view, illustrate the operation of the second embodiment of the self-covering element for a pipe joint and the pipe joint.
Figure 7:
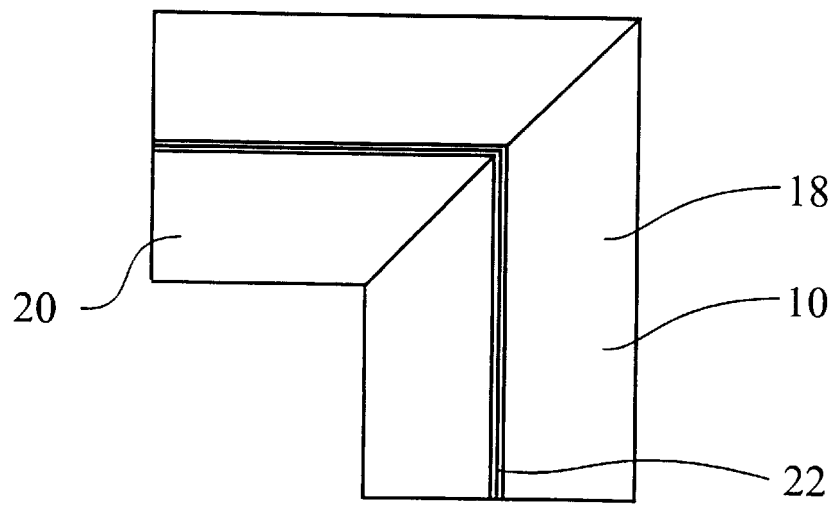
FIG. 7, in a top view, illustrates a second embodiment of the self-covering element for a pipe joint of FIG. 1.

Referring to FIGS. 4, 5 and 7 there is illustrated in a perspective and top views respectively, a self-covering element 10 for covering a pipe joint 11 in accordance with a second preferred embodiment of the present invention, showing the invention in an elbow shape. Operation of the second preferred embodiment is conducted in an identical way to the first embodiment.

The various pieces of the insulating element 12 may be produced in an extruder (not shown). For example, hollow cylindrical lengths of tube can be produced and slit along the length thereof. Thereafter the length of tubes may be cut or mitered to produce the components, namely, the first portion 18 and second portion 20. Mitered edges 9a and 9b of first portion 18 register with 9c and 9d of second portion 20, respectively. These mitered edges 9a, 9b, 9c, 9d may be glued, for example, or sonically or heat welded. It should be noted, however, that where the mitered edges are connected the longitudinal slits 22 in each of the portions 18 and 20 permit entry of the pipe joint 11, until the protective film 26 is removed. The insulating element which is made of the resilient material has a "memory" which biases the material in the closed portion, yet is resilient and deformable to be manipulated into the open portion shown. Therefore, when the pipe joint is introduced and the release films removed the pipe joint 11 is substantially covered by the insulating materials to exit an efficient covering.

Various embodiments of the invention have now been described in detail. Since changes in and/or additions to the above-described best mode may be made without departing from the nature, spirit or scope of the invention, the invention is not to be limited to said details.

I claim:

1. A method of installing a self-covering element for covering a pipe joint, said pipe joint disposed at an angle and generally defining a plane comprising:
   (a) moving a pre-assembled insulating element to a first open position, said insulating element having a first and second portion, said second portion disposed at an angle to said first portion, each said portion having;

(i) an inner surface
(ii) an outer surface
(iii) wherein said inner surface defines a hollow cavity adapted to receive said pipe joint
(iv) a slit disposed through said inner and outer surfaces, in a direction laterally toward said plane;
(b) positioning said first and second portions around said pipe in said first open position;
(c) releasing said first and second portions to a second closed position thereby surrounding said pipe joint; and
(d) removing a removable releasable film from a pressure sensitive adhesive adhered to said slit;
(e) sealing said slit and said pipe joint in said hollow cavity with said pressure sensitive adhesive upon the removal of said removable release film.

2. A method for installing a self-covering element as claimed in claim 1 wherein said first and second portions of said insulating element are mitered to one another to form an elbow joint.

3. A method for installing a self-covering element as claimed in claim 1 wherein said first and second portions of said insulating element are mitered to one another to form a T-joint.

4. A method for installing a self-covering element as claimed in claim 1 wherein said insulating element comprises said soft, resilient material.

5. A method for installing a self-covering element as claimed in claim 1 wherein said soft, resilient material is polyethylene foam.

6. A method of installing an insulating foam element around a pipe joint disposed at an angle and defining a plane of said pipe joint, said element having pre-assembled first and second portions joined together at said angle, said portions having an inner cavity adapted to receive said pipe joint and a longitudinal slit along and through one side of said portions to said cavity, said slit disposed in a direction generally perpendicular to said plane comprising:
(a) moving said pre-assembled foam element from a biased closed position to an open position by opening said slit disposed generally perpendicular to said plane of said pipe joint, whereby said pipe joint is received by said cavity;
(b) releasing said first and second portions to capture said pipe joint in said cavity, said portions moving to said closed biased position;
(c) removing a removable release film from a pressure sensitive adhesive adhered to said longitudinal slit along said portions;
(d) sealing said longitudinal slit and said pipe joint in said cavity with said pressure adhesive upon removal of said removable release film.

7. A method as claimed in claim 6 wherein said pipe joint is a T-joint.

8. A method as claimed in claim 7 wherein said pipe joint is disposed at 90°.

9. A method as claimed in claim 6 wherein said pipe joint is an elbow.

10. An insulating foam element for covering pipes joined together at an angle and defining a plane of said pipe joint comprising:
(a) a first portion connected to a second portion at said angle, said portions including an inner surface defining a cavity adapted to receive said pipe joint, and an outer surface;
(b) a slit extending along the length of said first and second portions through said outer and inner surface in a direction generally perpendicular to said plane of said pipe joint;
(c) said portions moveable from an open position permitting entry of said joint into said cavity to, a closed biased position for surrounding said pipe joint;
(d) a pressure sensitive adhesive present along said slot;
(e) removable release film disposed over said adhesive for sealing said slit and said pipe joint in said cavity upon removal of said film in said closed biased position.

11. An insulating foam element as claimed in claim 10 wherein said first and second portions are mitered to one another.

12. An insulating foam element as claimed in claim 11 wherein said first and second portions are mitered to form an elbow joint.

13. An insulating foam element as claimed in claim 12 wherein said first and second portions are mitered to form a T-joint.

14. An insulating foam element as claimed in claim 13 wherein said insulating foam element comprises polyethylene foam.

* * * * *